United States Patent [19]

Roling et al.

[11] Patent Number: 4,501,577
[45] Date of Patent: Feb. 26, 1985

[54] SPROCKET WHEEL

[75] Inventors: Franz Roling; Gunther D. Schoop, both of Lunen, Fed. Rep. of Germany

[73] Assignee: Gewerkschaft Eisenhutte Westfalia, Fed. Rep. of Germany

[21] Appl. No.: 370,632

[22] Filed: Apr. 21, 1982

[30] Foreign Application Priority Data

Apr. 22, 1981 [DE] Fed. Rep. of Germany ....... 3115927

[51] Int. Cl.³ .................... F16H 55/30; F16H 7/00; B65G 25/06
[52] U.S. Cl. .................... 474/155; 474/152; 474/164; 474/154; 198/834
[58] Field of Search ............... 474/164, 152, 153, 155; 114/210, 293; 198/834

[56] References Cited

U.S. PATENT DOCUMENTS

| 662,768 | 11/1900 | Crowe | 474/164 |
| 1,412,068 | 4/1922 | Stahl | 474/164 |
| 2,176,335 | 10/1939 | Gray | 474/175 |
| 3,792,622 | 2/1974 | Lyall | 474/164 |
| 4,095,478 | 6/1978 | Rynik | 474/164 |
| 4,343,614 | 8/1982 | Schulte | 474/155 |

FOREIGN PATENT DOCUMENTS

| 1525025 | 6/1969 | Fed. Rep. of Germany | 474/175 |
| 2735792 | 2/1979 | Fed. Rep. of Germany | 474/164 |
| 2343175 | 9/1977 | France | 474/155 |
| 327085 | 3/1930 | United Kingdom | 474/164 |
| 856579 | 12/1960 | United Kingdom | 474/164 |

Primary Examiner—Lawrence J. Staab
Assistant Examiner—Michael D. Bednarek
Attorney, Agent, or Firm—Sughrue, Mion, Zinn, Macpeak & Seas

[57] ABSTRACT

A sprocket wheel has a plurality of equi-spaced circumferential teeth, and a plurality of pockets positioned between the teeth. A central circumferential groove in the sprocket wheel divides each of the teeth into two parts. Each of the pockets is shaped to engage with a link of a drive chain, each of the pockets being formed partially by flanks provided on each of the two parts of each of the pair of adjacent teeth defining that pocket. The flanks constitute chain link bearing faces, and each of the flanks has at least three separate bearing surfaces.

11 Claims, 5 Drawing Figures

SPROCKET WHEEL

BACKGROUND TO THE INVENTION

This invention relates to a sprocket wheel for driving and/or guiding a drive chain for a scraper-chain conveyor or a mineral winning machine such as a coal plough. The invention is particularly concerned with a sprocket wheel for use with a drive chain having chain links made from rod of circular cross-section.

The sprocket wheel of this type has a plurality of equi-spaced circumferential teeth. The adjacent teeth define pockets for the reception of the links of a drive chain. Each of the teeth is of two-part construction, the sprocket wheel being formed with a central circumferential groove which passes through all the teeth thereby defining their two-part construction. Alternate links of the chain lie within the pockets as the chain passes round the sprocket wheel, and the remaining links (which lie substantially at right-angles to the first-mentioned links) are accommodated in the groove. The two ends of each pocket are defined by flanks formed on the mutually-facing portions of the two parts of each of the teeth defining that pocket. The tooth flanks at the two ends of each pocket converge slightly, and define chain link bearing faces.

In a known sprocket wheel of this type, the tooth flanks formed at each end of each pocket are constituted by bearing surfaces which are inclined to one another at an angle of about 90°. The arrangement is such that the chain links contact the tooth flanks at points which are disposed at a predetermined distance from the central circumferential groove. In this way, it is possible to avoid excessively high punctiform loading of the tooth flanks immediately adjacent to the groove. If such loading were to occur, it would result in heavy wear of the chain links, and may lead to the formation of what are known as "parsons' noses". This sprocket wheel is described in DE-AS No. 2735792.

The disadvantage of this sprocket wheel is that, owing to the unavoidable variations in chain link size which occur during manufacture of chains made from rod of circular cross-section, excessively high punctiform loading can still occur, and this can lead to dangerous notching of the chain links. Moreover, even where the points of contact of the chain links with the tooth flanks are intended to lie at the predetermined (safe) distance from the edge of the central circumferential groove in the sprocket wheel, the points of contact can move nearer the groove for chain links of different sizes.

The aim of the invention is to provide a sprocket wheel which does not suffer from these disadvantages.

SUMMARY OF THE INVENTION

The present invention provides a sprocket wheel having a plurality of equi-spaced circumferential teeth, each pair of adjacent teeth defining therebetween a pocket, the pockets being shaped to engage with the links of a drive chain, the teeth having flanks constituting chain link bearing faces, each of the pockets being formed partially by the flanks of the pair of adjacent teeth defining that pocket, wherein each of the flanks has at least three separate bearing surfaces.

The separate bearing surfaces provided by the tooth flanks of this sprocket wheel ensure that multi-point (rather than single-point) contact with their links occurs. This means that particularly favourable loading conditions can be achieved, whilst excessively high loading peaks can be avoided. Consequently, dangerous notching and heavy wear of the links can be prevented. In practice, each chain link is supported on each tooth flank at at least two zones, these zones being defined by said bearing surfaces.

Advantageously, each of the teeth is of two-part construction, the sprocket wheel being formed with a central circumferential groove which passes through the teeth thereby defining their two-part construction, and wherein each part of each tooth is formed with a respective flank for each of the adjacent pockets, each flank having at least three separate bearing surfaces. In this case, the regions where the tooth flanks merge with the groove are set back, that is to say they are rounded off to such an extent that no harmful chain link pressure can occur in these regions, even with the unavoidable variation in the sizes of chain links during manufacture.

In a preferred embodiment, each of the flanks is corrugated, the projecting parts of the corrugations forming the bearing surfaces, and the recessed portions of the corrugations forming recesses separating the bearing surfaces. Advantageously, the projecting portions of the corrugations of the flanks of each tooth which are associated with the same pocket lie on the arc of a circle, the centre of said circle lying substantially on the longitudinal axis of the associated pocket. Preferably, a first bearing surface of each flank is positioned adjacent to said groove, a second bearing surface of that flank is positioned at the edge portion of that tooth remote from said groove, and a third bearing surface of that flank is positioned between the first and second bearing surfaces.

In another preferred embodiment, the bearing surfaces of each flank are constituted by a plurality of mutually-inclined planar surfaces. Advantageously, each tooth flank is provided with three bearing surfaces. Preferably, each tooth flank has a first bearing surface positioned adjacent to said groove, a second bearing surface positioned at the edge of that tooth remote from said groove, and a third bearing surface positioned between the first and second bearing surfaces, and wherein the bearing surfaces of each pair of adjacent bearing surfaces meet to define a line of indentation.

Conveniently, the angle of inclination between the two first bearing surfaces of each tooth associated with the same pocket is greater than the angle of inclination between the third bearing surfaces of that tooth associated with that pocket, which in turn is greater than the angle of inclination between the second bearing surfaces of that tooth associated with that pocket. Preferably, the angle between said first pair of bearing surfaces of each tooth is within the range of from 100° to 120°, the angle of inclination between said second pair of bearing surfaces of that tooth is in the range of from 50° to 70°, and the angle of inclination between the third bearing surfaces of that tooth is in the range of from 70° to 90°.

An advantage of each of the preferred embodiments is that construction of the tooth flanks reduces the possibility of fine material (such as coal dust) becoming caked on the tooth flanges, since spaces permitting the escape of such fine material are created between the bearing surfaces. These spaces are constituted by the corrugation recesses in the first preferred embodiment, and by the lines of indentation in the second.

BRIEF DESCRIPTION OF THE DRAWINGS

The invention will now be described in greater detail, by way of example, with reference to the accompanying drawings, in which.

DESCRIPTION OF PREFERRED EMBODIMENTS

Figure 1:
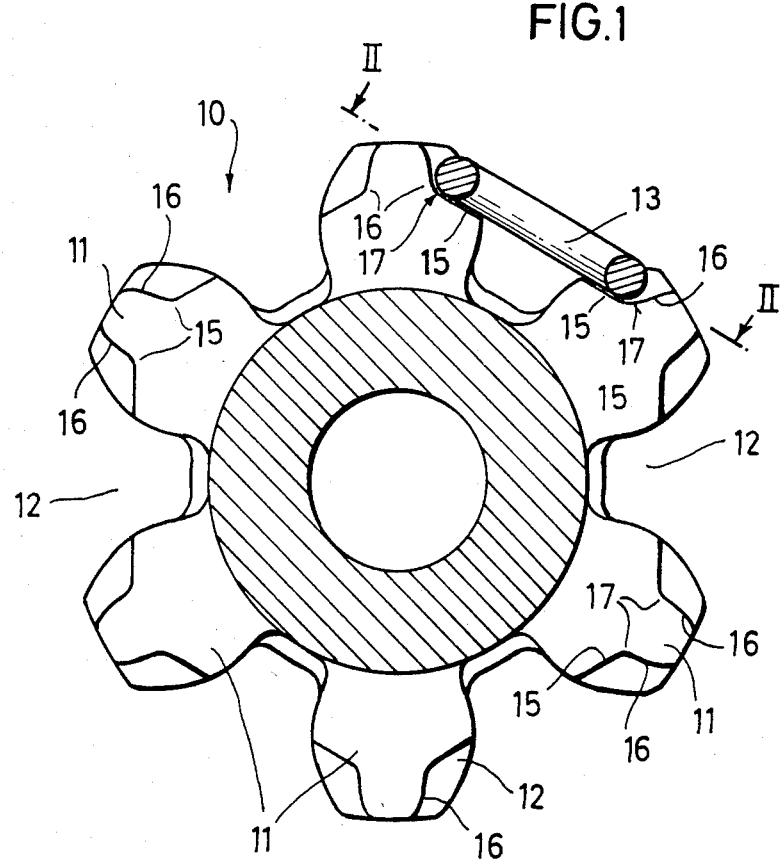
FIG. 1 is a part-sectional side elevation of a sprocket wheel.

Referring to the drawings, FIG. 1 shows a sprocket wheel 10 which is used for driving and/or guiding a drive chain for a scraper-chain conveyor or a mineral winning machine such as a coal plough. For example, the sprocket wheel 10 could be fitted, in the manner of a crown wheel, to a hollow drum to form a sprocket drum for driving a scraper-chain conveyor. The sprocket wheel 10 has teeth 11 which define pockets 12 therebetween. The pockets 12 are shaped to conform with the links of the drive chain which are made from rod of circular cross-section. FIG. 1 shows the position of one link 13 of a drive chain, this link lying flat within a chain pocket 12. In the known manner, each of the teeth 11 is formed with a circumferential groove 14 (see FIGS. 2 to 5), these grooves accommodating the chain links which lie at right-angles to the links (such as the link 13) which lie flat in the pockets 12.

The teeth 11 are profiled to define the pockets 12. Thus, each pair of grooved adjacent teeth 11 have faces 15 forming the floor of the pocket 12 defined by those teeth, and flanks 16 which define the walls of that pocket. The flanks 16 engage the chain links 13 to transfer drive to the chain from the sprocket wheel 10. Each tooth face 15 merges with its flank 16 by way of a rounded face 17. In the embodiment shown in FIGS. 2 and 3, the tooth flanks 16 are of corrugated construction. Thus, each flank 16 has three rounded projections 18 and a pair of rounded, intermediate recesses 19. The projections 18 on the flanks 16 of each tooth 11 lie on the arc of a circle, the centre M of which is located on the longitudinal axis A of the pocket 12. The centre M is also positioned substantially at the centre of the arc defined by the outer surface of the curved end portion of the link 13. This arc has a radius R.

Figure 2:
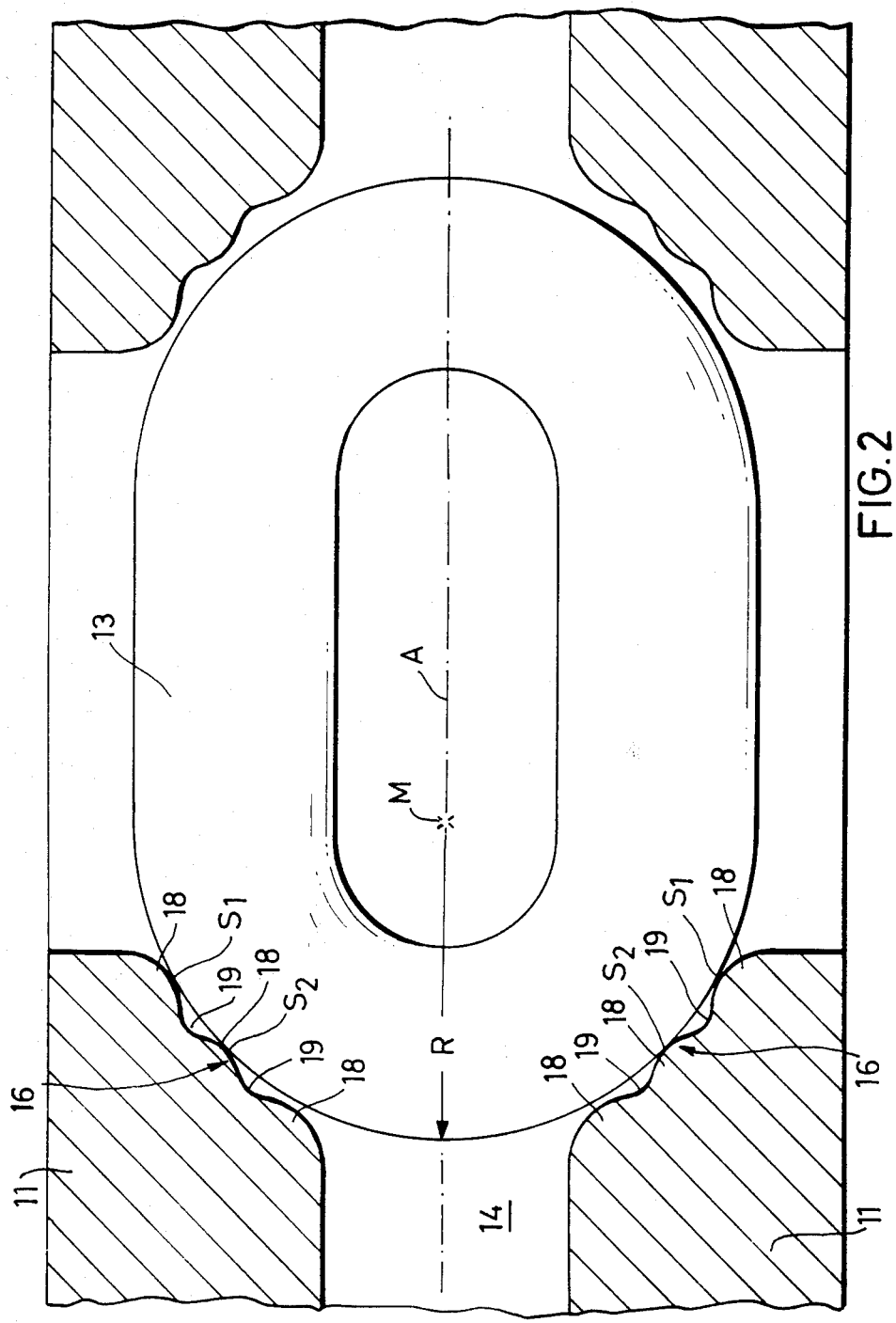
FIG. 2 is a cross-section taken on the line II—II of FIG. 1, and shows a first preferred form of sprocket tooth construction and one link of a chain associated with the sprocket wheel.

As can be seen from FIG. 2, the link 13 bears against each of the flanks 16 of the left-hand tooth 11 at two points; namely at $S_1$ on each of the outer projections 18, and at $S_2$ on each of the intermediate projections 18. There is no contact with the inner projections 18 which are adjacent to the groove 14 dividing the tooth 11.

Figure 3:
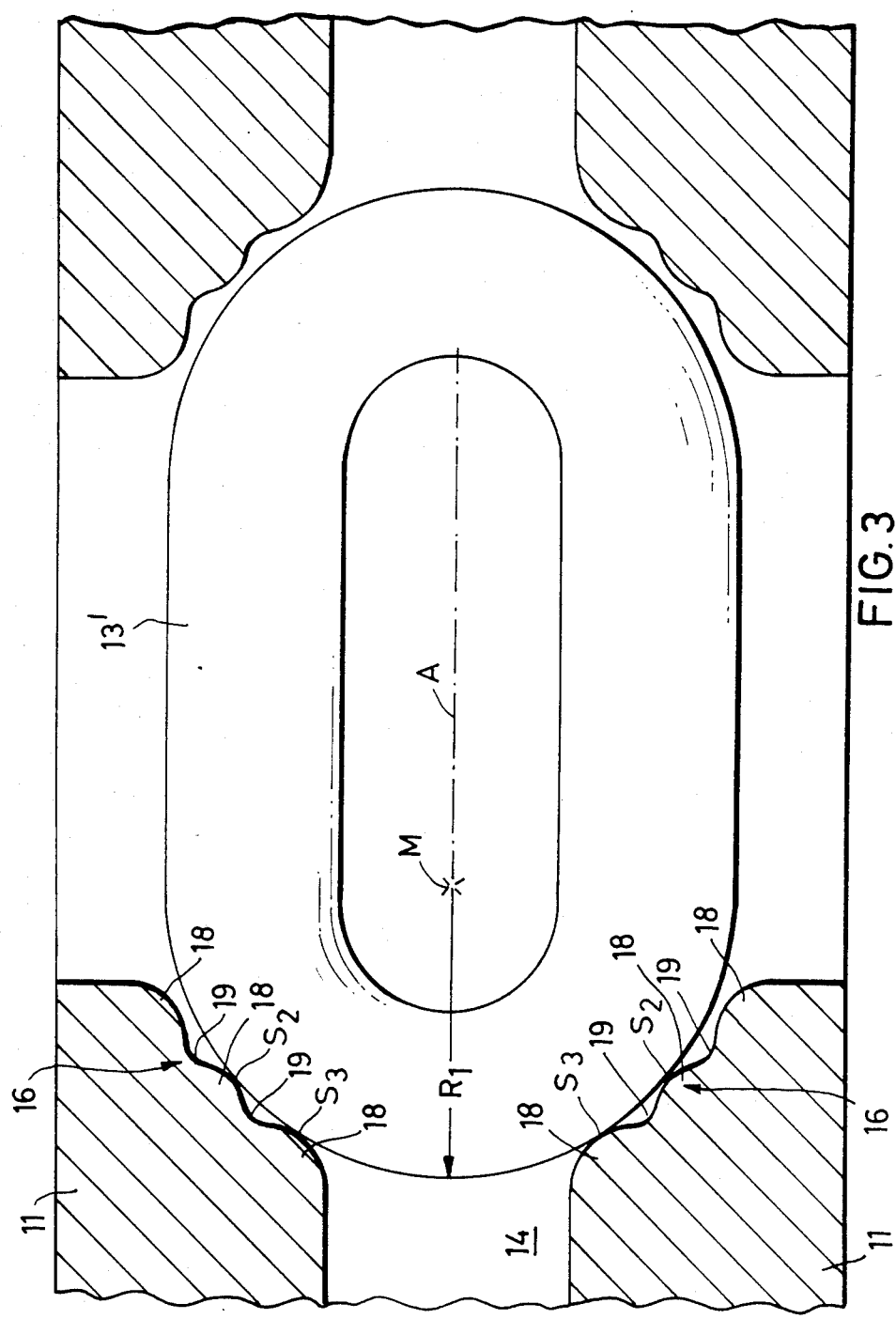
FIG. 3 is a cross-section similar to that of FIG. 2. but showing a slightly differently sized chain link.

FIG. 3 shows the same situation as FIG. 2, except that here the link 13' has a curved end portion whose radius $R_1$ is approximately 3 millimeters less than the radius R of the curved end portion of the link 13 shown in FIG. 2. Such a variation in size between the two links 13 and 13' lies within the tolerances which are unavoidable in the manufacture of chain links of this type. As shown in FIG. 3, the link 13' bears against the intermediate and inner projections 18 (at $S_2$ and $S_3$ respectively) of the flanks 16 of the left-hand tooth 11. Thus, as with the link 13, the link 13' has a two-point contact with each of the flanks 16.

Figure 4:
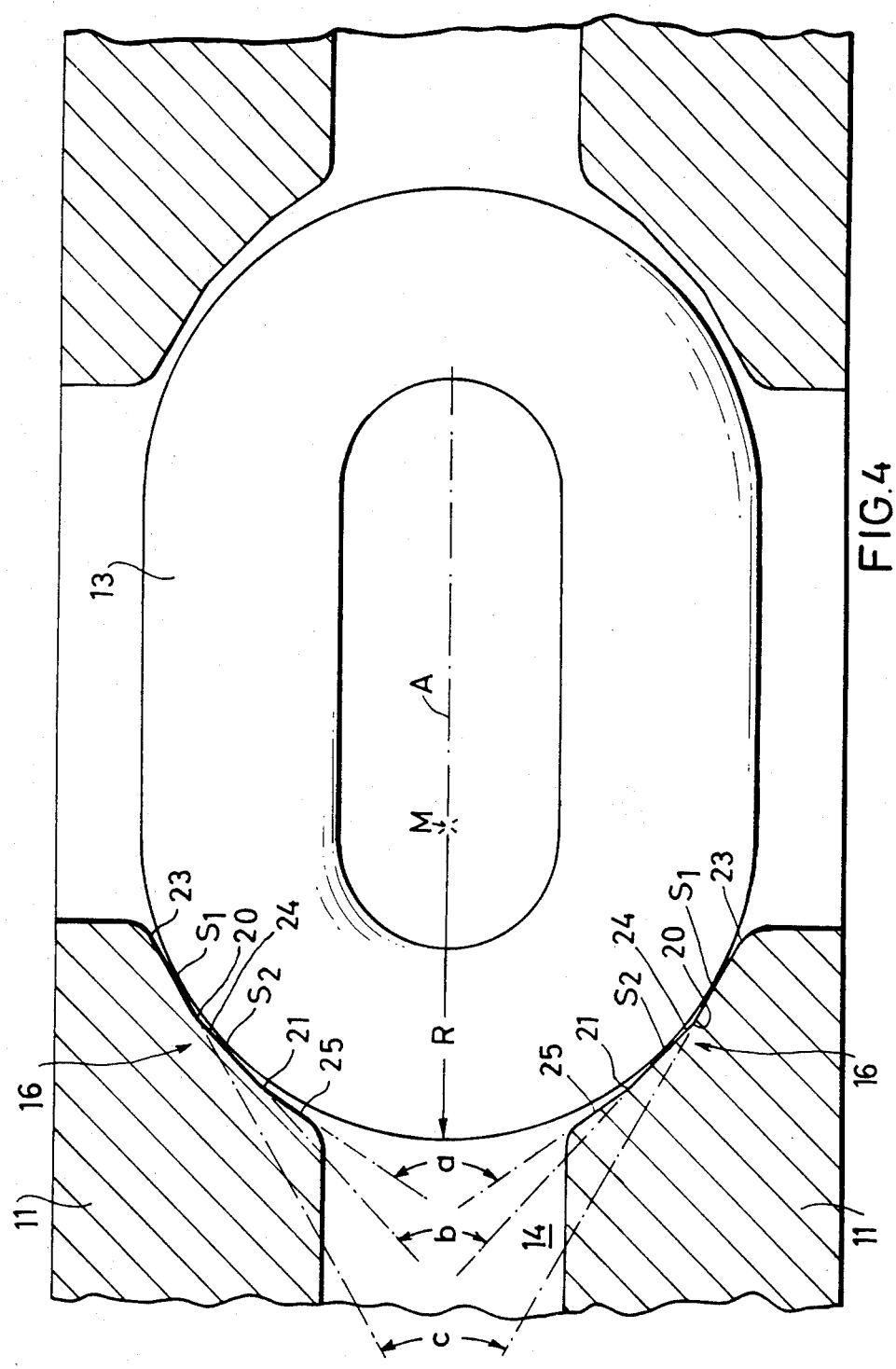
FIGS. 4 and 5 are views corresponding to FIGS. 2 and 3, but showing a second preferred form of sprocket tooth construction.
Figure 5:
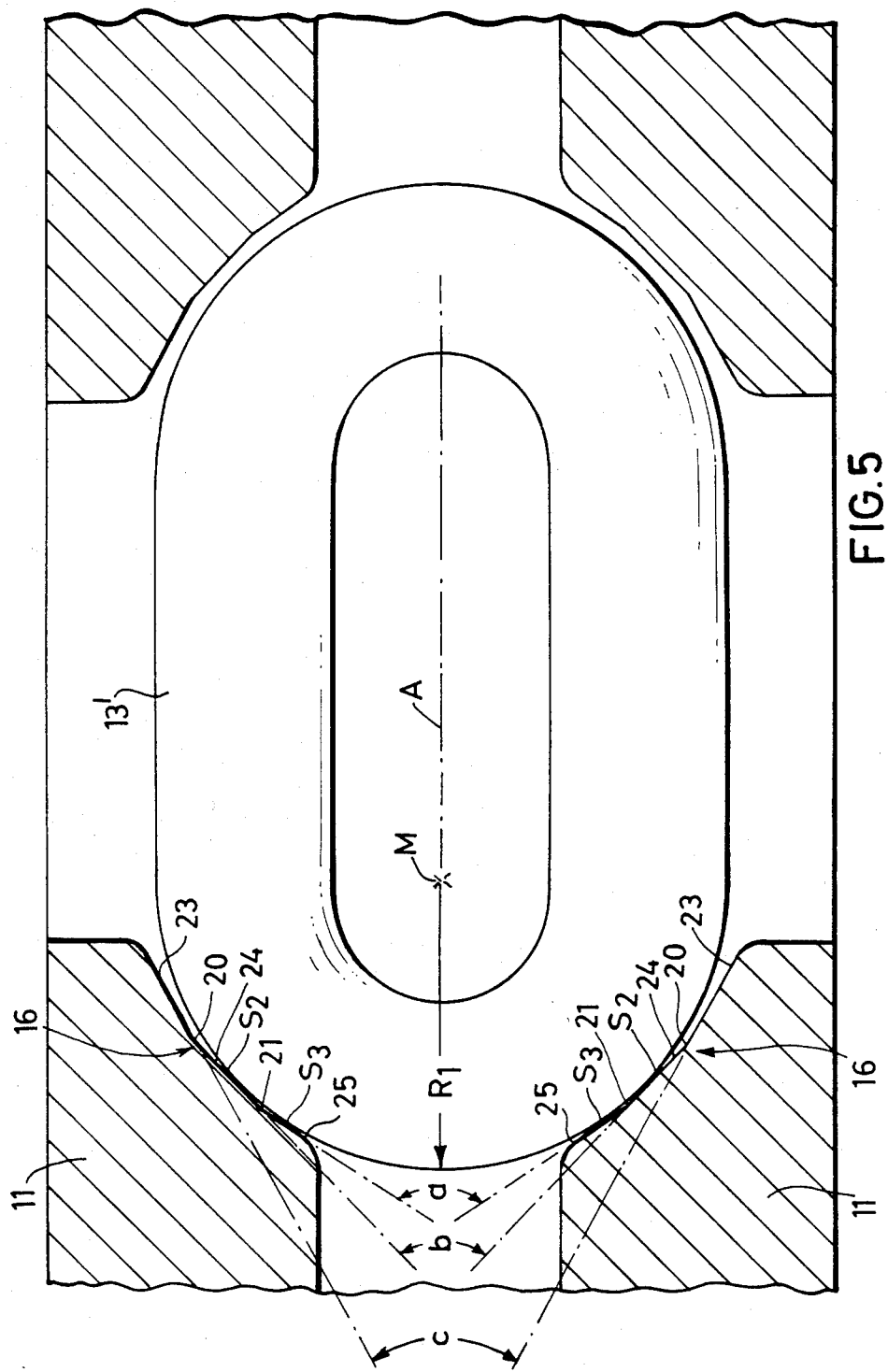

In the embodiment shown in FIGS. 4 and 5, each of the tooth flanks 16 is multi-faced, that is to say each has three mutually-inclined planar faces 23, 24 and 25. The pairs of adjacent faces 23, 24 and 25 meet at indentations 20 and 21 respectively. The inner faces 25 of the flanks 16 are inclined to one another by an angle a of approximately 110°, the intermediate faces 24 at an angle b of approximately 90°, and the outer faces 23 at an angle c of approximately 60°. The apices of the angles a, b and c lie on the longitudinal axis A of the pocket 12.

As can be seen from FIG. 4, the link 13 (which is the same size as the link 13 of FIG. 2) bears against the faces 23 and 24 of the flanks 16 of the left-hand tooth 11 at the points $S_1$ and $S_2$. Similarly, as shown in FIG. 5, the link 13' (which is the same as the link 13' of FIG. 3) bears against the faces 24 and 25 of the flanks 16 at the points $S_2$ and $S_3$. Here again, therefore, a two-point contact occurs between each of the tooth flanks 16 and each of the links 13 and 13'.

It will be apparent that the two forms of tooth construction described above results in two-point contact between the tooth flanks and the chaink links, irrespective of differences in the sizes of the links that occur during manufacture. Consequently, an optimum loading of the chain links in the pockets of the sprocket wheel is achieved, and the chain and pockets are subjected to the minimum wear.

We claim:

1. A sprocket wheel having a plurality of equi-spaced circumferential teeth, each pair of adjacent teeth defining therebetween a pocket, the pockets being shaped to engage links of a drive chain, said teeth having flanks constituting chain link bearing faces, each of the pockets being formed partially by the flanks of a pair of adjacent teeth defining that pocket, the improvement wherein each of the flanks has at least three distinct bearing surfaces which define multiple contact points between the chain links engaged the flanks of said pair of adjacent teeth, such that said at least three distinct bearing surfaces ensure multiple point contact between said chain links and each flank irrespective of minor size variation in said chain links, thereby eliminating high loading peaks and preventing dangerous notching and heavy wear of the chain links.

2. A sprocket wheel according to claim 1, wherein each of the teeth is of two-part construction, the sprocket wheel being formed with a central circumferential groove which passes through the teeth thereby defining their two-part construction, and wherein each part of each tooth is formed with a respective flank for each of the adjacent pockets.

3. A sprocket wheel according to claim 2, wherein each of the flanks is corrugated, the projecting parts of the corrugations forming the bearing surfaces, and the recessed portions of the corrugations forming recesses separating the bearing surfaces.

4. A sprocket wheel according to claim 3, wherein the projecting portions of the corrugations of the flanks of each tooth which are associated with the same pocket lie on the arc of a circle.

5. A sprocket wheel according to claim 4, wherein the centre of said circle lies substantially on the longitudinal axis of the associated pocket.

6. A sprocket wheel according to claim 3, wherein a first bearing surface of each flank is positioned adjacent to said groove, a second bearing surface of that flank is positioned at the edge portion of that tooth remote from said groove, and a third bearing surface of that flank is positioned between the first and second bearing surfaces.

7. A sprocket wheel according to claim 2, wherein the bearing surfaces of each flank comprise a plurality of mutually-inclined intersecting planar surfaces.

8. A sprocket wheel according to claim 7 wherein each tooth flank is provided with three distinct bearing surfaces.

9. A sprocket wheel according to claim 8, wherein each tooth flank has a first bearing surface positioned adjacent to said groove, a second bearing surface positioned at the edge portion of that tooth remote from said groove, and a third bearing surface positioned between the first and second bearing surfaces, and wherein the bearing surfaces of each pair of adjacent bearing surfaces intersect to define a line of indentation.

10. A sprocket wheel according to claim 9, wherein the angle of inclination between the two first bearing surfaces of each tooth associated with the same pocket is greater than the angle of inclination between the third bearing surfaces of that tooth associated with that pocket, which in turn is greater than the angle of inclination between the second bearing surfaces of that tooth associated with that pocket.

11. A sprocket wheel according to claim 10, wherein the angle between said first pair of bearing surfaces of each tooth is within the range of from 100° to 120°, the angle of inclination between said second pair of bearing surfaces of that tooth is in the range of from 50° to 70°, and the angle of inclination between the third bearing surfaces of that tooth is in the range of from 70° to 90°.

* * * * *